Aug. 3, 1948. T. L. CUMMINGS 2,446,266
JET PROPELLED HELICOPTER ROTOR
Filed Feb. 23, 1946 2 Sheets-Sheet 1
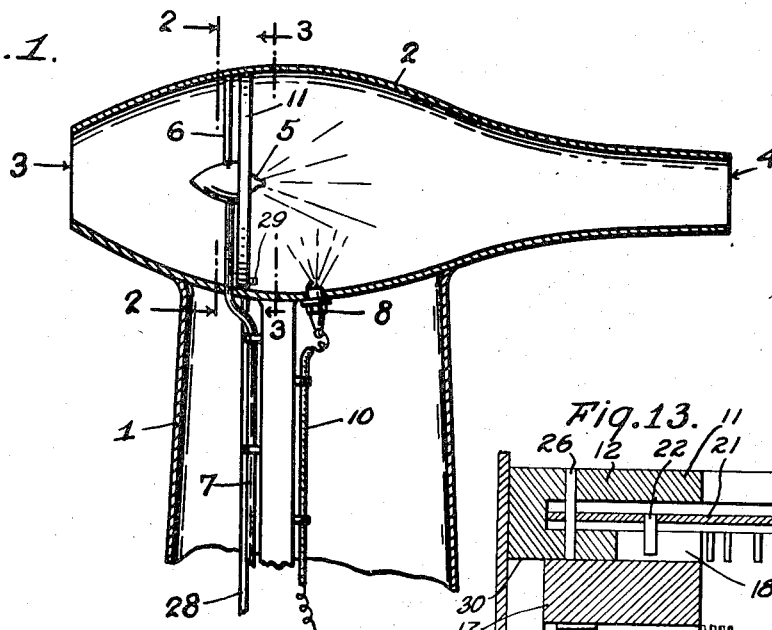
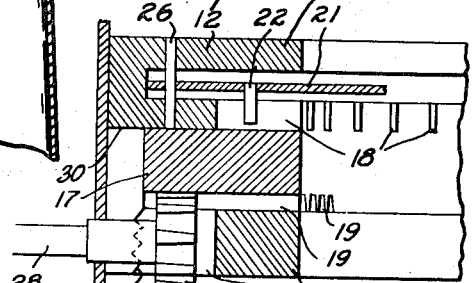
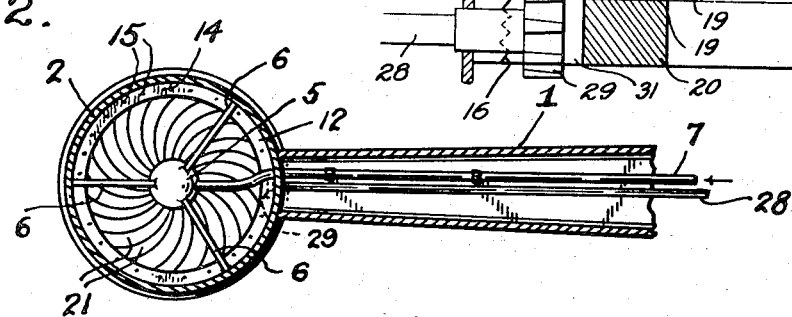
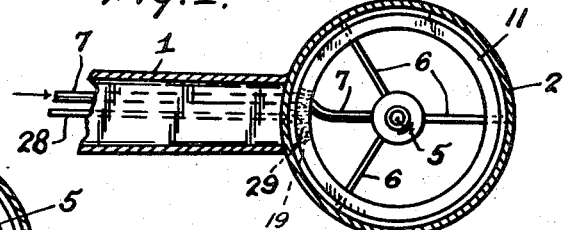
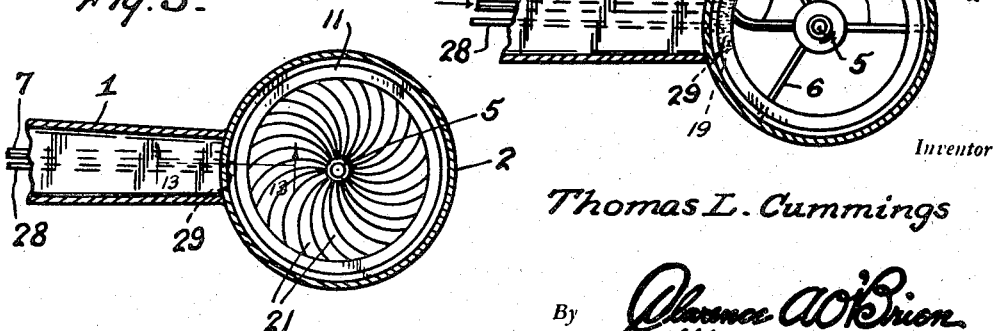
Inventor
Thomas L. Cummings
By Clarence A. O'Brien
and Harvey B. Jacobson
Attorneys Aug. 3, 1948.　　　　T. L. CUMMINGS　　　　2,446,266
JET PROPELLED HELICOPTER ROTOR
Filed Feb. 23, 1946　　　　　　　　　　　　2 Sheets-Sheet 2
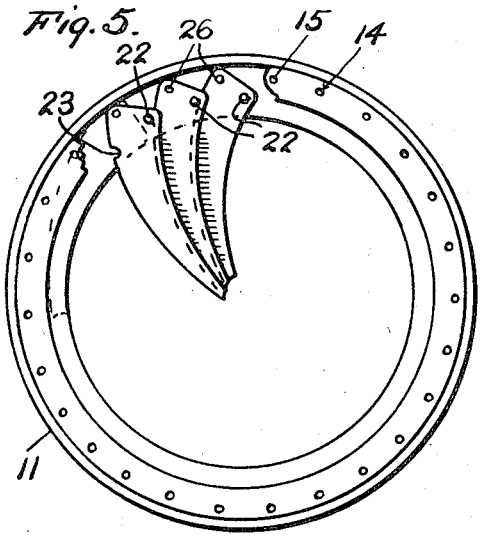
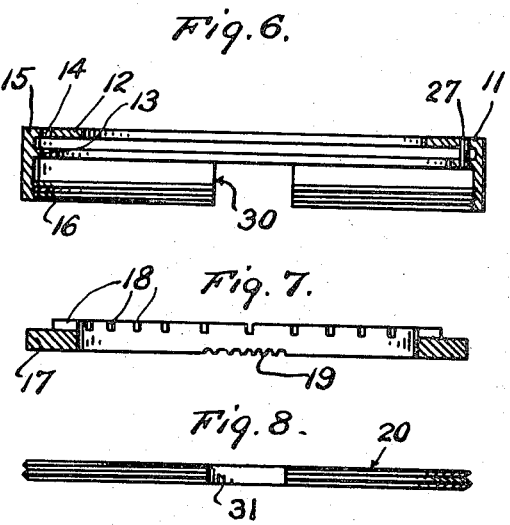
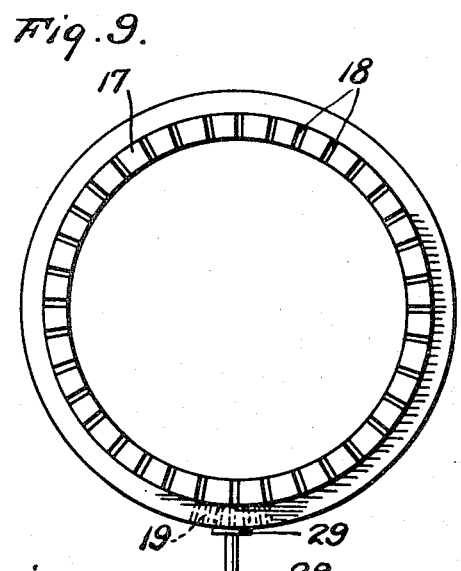
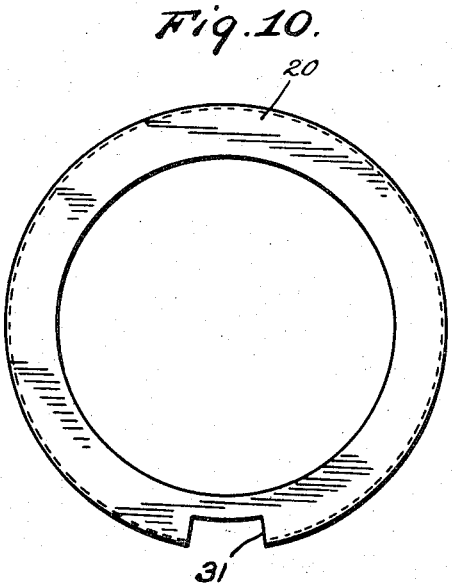
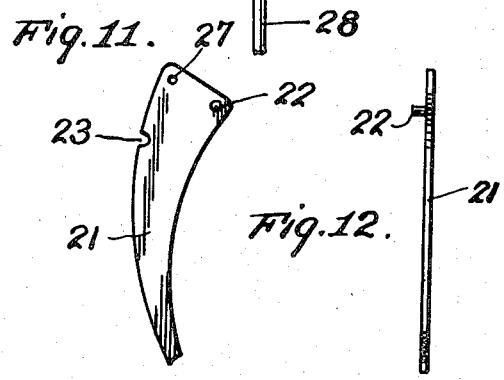
Inventor
Thomas L. Cummings
By Clarence A. O'Brien
and Harvey B. Jacobson
Attorneys Patented Aug. 3, 1948

2,446,266

UNITED STATES PATENT OFFICE 2,446,266

JET PROPELLED HELICOPTER ROTOR

Thomas L. Cummings, Port Angeles, Wash.

Application February 23, 1946, Serial No. 649,621

4 Claims. (Cl. 170—135.5)

This invention relates to improvements in jet-propelled helicopter rotors, and more particularly to a blowback stop mechanism which will seal off the air and close the lead port in the jet motor housing from the combustion chamber until the tip speed of the helicopter rotor reaches an approximate speed of 350 M. P. H., after which time compressed air fed to the combustion chamber for starting will be cut off, and the blowback stop mechanism will be opened to admit air to enter the inlet port so that the jet mechanism may be operated by ram compression. The term "blowback" as used throughout the following description and claims connotes the forward movement of combustion gases toward their air inlet port which would occur, in the absence of means similar to the subject matter of this application, prior to the attaining of sufficient air speed to provide adequate ram air pressure.

An object of the invention is to provide an improved blowback stop mechanism for jet propelled helicopter rotors whereby the jet motor will be started by compressed air until the rotor reaches a tip speed of approximately 350 M. P. H., after which the motor will operate by ram compression, and the speed and power will be controlled by metering the fuel.

Another object of the invention is to provide an improved blowback stop mechanism for jet propelled helicopter rotors, which will be highly efficient in operation, and relatively inexpensive to manufacture and produce.

Other objects will appear as the description proceeds.

In the accompanying drawings which form a part of this application,

Figure 1 is a longitudinal sectional view through the jet motor and tip of a helicopter rotor;

Figure 2 is a sectional view taken on the line 2—2 of Figure 1;

Figure 3 is a sectional view taken on the line 3—3 of Figure 1, showing the radial segments of the blowback stop in closed position;

Figure 4 is a similar view as shown in Figure 3, but with the radial segments of the blowback stop in open position;

Figure 5 is a front elevation of the stationary ring showing the positioning of three radial segments therein;

Figure 6 is a vertical sectional view through the stationary ring;

Figure 7 is a vertical sectional view through the operating ring;

Figure 8 is an edge elevational view through the retaining ring;

Figure 9 shows the operating pinion in mesh with the rack on the operating ring;

Figure 10 is a top plan of the retaining ring;

Figure 11 is the side view of one of the radial segments, and

Figure 12 is an end view of one of the radial segments.

Figure 13 is a detail sectional view.

Like characters of reference are used throughout the following specification and the accompanying drawings to designate corresponding parts.

In carrying out the invention, there is provided a helicopter having a plurality of rotor blade airfoils 1 which will be suitably streamlined and connected in any desired manner to the fuselage (not shown) of a helicopter.

Each rotor tip will support a jet motor comprising a streamlined housing 2 formed with an air inlet port 3 at its forward end, and an exhaust port 4 at its rear end.

A fuel spray nozzle 5 will be directed rearwardly in the jet motor housing 2, and will be supported therein by the radially extending internal brace rod 6 connected between the inner wall of the housing and the body of the fuel spray nozzle. A fuel line 7 will be connected with the spray nozzle 5, and will lead through the rotor 1 to a fuel tank and compression means for the fuel (not shown), in the helicopter fuselage.

A spark plug 8 will be positioned to extend through the housing 2 of the jet motor into the combustion chamber 9, and will be connected by the electric wire or cable 10 extending through the rotor 1 to a suitable ignition coil and battery (not shown) but located in the helicopter fuselage.

The improved blowback stop mechanism will extend about the rear end of the fuel spray nozzle 5, and will include an outer stationary ring 11 formed with the spaced inwardly extending annular flanges 12 and 13, the same being provided with a series of annularly arranged apertures 14 and 15, respectively, to support the outer ends of the radially disposed blade segments later to be described. The inner and forward end of the ring 11 is threaded as at 16, and is adapted to receive the operating ring 17 formed with the spaced radially extending slots 18 in one surface, and the annular toothed rack 19 in its opposite surface. The retaining ring 20 is externally threaded, and is adapted to cooperate with the interiorly disposed threads 16 in the stationary ring 11.

A plurality of curved blade segments 21 are adapted to be received in the annular channel formed between the flanges 12 and 13 in the stationary ring 11, and are tapered from their outer ends to their inner ends, and are arranged to partially overlie adjacent segments. Pins 22 are supported at the outer ends of the segments 21, and are adapted to be positioned within the radially extending slots 18 in the operating ring 17, and notches 23 are formed in the outer end of the opposite curved edge of each segment 21, to be engaged by the pin 22 in the next adjacent segment.

The spaced annular flanges 12 and 13 on the stationary ring 11 are formed with the annularly arranged aligned apertures 24 and 25, and are adapted to receive the pivot pins 26 which extend through the apertures 27 in the blade segments 21, to provide the opening and closing of the segments to open the air inlet port 3 when the jet motor is to be run on ram compression, and to close the segments to seal off the air entering the lead port 3 from the combustion chamber, while the jet motor is starting on compressed air and until the tip speed of the helicopter rotor reaches a speed of approximately 350 M. P. H.

A segment operating mechanism including a shaft 28 extending from the helicopter fuselage through the rotor blade airfoil 1 to the body or housing 2 of the jet motor supports a bevel gear 29 which extends through the notches 30 and 31 formed in the stationary ring and retaining ring respectively, said gear 29 intermeshing with the annular toothed rack 19 on the operating ring 17, whereby rotation of the shaft 28 in one direction will close or seal off the combustion chamber 32 from the air inlet port 3, while rotation of the shaft 28 in the opposite direction will move the segments 21 to permit the jet motor to operate on ram combustion.

There are various advantages secured from the use of a device formed in accordance with the instant invention, some of which are the use of a minimum number of operating parts; no torque applied to the fuselage; operation on low grade fuel, and no moving parts required to operate at a high temperature.

While the preferred embodiment of the invention has been illustrated and described, it will be understood that it is not intended to limit the scope of the invention thereto, as many minor changes and detail of construction may be resorted to without departure from the spirit of the invention.

Having thus described my invention what I claim as new and desire to secure by Letters Patent of the United States is:

1. A device of the character described including a helicopter rotor airfoil, a jet motor at the end thereof having an air inlet port and a discharge port, a fuel spray jet in said motor, means for igniting said fuel, an adjustable blowback stop mechanism for sealing off the air entering said air inlet port including a channeled stationary ring, a plurality of overlapping segments pivotally supported in said ring adapted to seal off the air entering said air inlet port, an operating ring associated with said stationary ring, and means for rotating said operating ring for opening and closing said segments.

2. A device of the character described including a helicopter rotor airfoil, a jet motor at the end thereof having an air inlet port and a discharge port, a fuel spray nozzle positioned in said motor, means for igniting said fuel, an adjustable blowback stop mechanism for sealing off the air entering said air inlet adjacent said fuel spray nozzle, said mechanism including a channeled stationary ring positioned in said motor, an operating ring adapted to be positioned in said stationary ring and formed with a plurality of radially disposed slots, a plurality of overlapping segments supported in the channel in said stationary ring and engaging the radially disposed slots in said operating ring, and means for rotating said operating ring to effect the opening and closing of said segments.

3. The subject matter as claimed in claim 2, and a retaining ring for holding the parts of the stop mechanism in position.

4. The subject matter as claimed in claim 2, a retaining ring positioned in the stationary ring for holding the parts of the stop mechanism in position, and a rack and pinion means for rotating said operating ring for opening and closing said segments.

THOMAS L. CUMMINGS.

REFERENCES CITED

The following references are of record in the file of this patent:

UNITED STATES PATENTS

| Number | Name | Date |
| --- | --- | --- |
| 1,099,083 | Duc | June 2, 1914 |
| 1,569,607 | Beck | Jan. 12, 1926 |
| 2,142,601 | Bleecker | Jan. 3, 1939 |
| 2,330,056 | Howard | Sept. 21, 1943 |
| 2,397,357 | Kundig | Mar. 26, 1946 |

FOREIGN PATENTS

| Number | Country | Date |
| --- | --- | --- |
| 423,590 | France | Feb. 20, 1911 |